(12) United States Patent
Muratani

(10) Patent No.: US 7,253,964 B2
(45) Date of Patent: Aug. 7, 2007

(54) ZOOM LENS SYSTEM

(75) Inventor: Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/224,928

(22) Filed: Sep. 14, 2005

(65) Prior Publication Data

US 2006/0056053 A1 Mar. 16, 2006

(30) Foreign Application Priority Data

Sep. 15, 2004 (JP) ............................ 2004-268952
Sep. 7, 2005 (JP) ............................ 2005-259575

(51) Int. Cl.
*G02B 15/14* (2006.01)

(52) U.S. Cl. ...................... 359/687; 359/715; 359/740; 359/774

(58) Field of Classification Search ................ 359/676, 359/683–686, 715, 740, 774
See application file for complete search history.

(56) References Cited

U.S. PATENT DOCUMENTS 5,042,927 A * 8/1991 Ogawa et al. .............. 359/683
5,568,321 A * 10/1996 Ogawa et al. .............. 359/676
5,579,171 A * 11/1996 Suzuki et al. ............... 359/687
5,638,216 A 6/1997 Horiuchi et al.
5,739,961 A 4/1998 Nakayama et al.
5,754,346 A 5/1998 Nakayama et al.
5,784,205 A 7/1998 Nakayama et al.

FOREIGN PATENT DOCUMENTS

JP 2003-241092 A 8/2003

* cited by examiner

*Primary Examiner*—Evelyn A. Lester
(74) *Attorney, Agent, or Firm*—Miles & Stockbridge P.C.

(57) ABSTRACT

An object is to provide a zoom lens system having compactness, a high zoom ratio, and high optical performance with preferably correcting various aberrations. The zoom lens system includes, in order from the object, a first lens group G1 having positive refractive power, a second lens group G2 having negative refractive power, a third lens group G3 having positive refractive power, and a fourth lens group G4 having positive refractive power. When a state of lens group positions varies from a wide-angle end state to a telephoto end state, a distance between the first lens group G1 and the second lens group G2 increases, a distance between the second lens group G2 and the third lens group G3 decreases, a distance between the third lens group G3 and the fourth lens group G4 varies, and the fourth lens group G4 moves along a zoom trajectory having a convex shape facing to an image.

35 Claims, 10 Drawing Sheets

ZOOM LENS SYSTEM

The disclosures of the following priority applications are herein incorporated by reference, Japanese Patent Application Nos. 2004-268952 and 2005-259575.

BACKGROUND OF THE INVENTION

1. Field of the Invention

The present invention relates to a zoom lens system suitable for a compact camera using a solid-state imaging device such as a CCD and in particular to a zoom lens system having a four-lens-group configuration of a positive-negative-positive-positive power arrangement.

2. Related Background Art

As a zoom lens system suitable for a solid-state imaging device such as a CCD, a zoom lens system constructed by a four-lens-group lens system having a lens group with positive refractive power disposed to the most object side has been disclosed in Japanese Patent Application Laid-Open No. 2003-241092.

In accordance with a recent trend in high integration of a solid-state imaging device, a zoom lens system capable of obtaining a high contrast in even higher special frequency has been requested. However, it causes a problem that a conventional zoom lens system becomes larger in the diameter of a lens increasing the number of lens elements in order to increase optical performance.

In accordance with popularization in a digital camera, contradictory requests of portability (specifically, compactness and light weight) and a high zoom ratio are required to be satisfied at a time.

In the zoom lens system disclosed in Japanese Patent Application Laid-Open No. 2003-241092, although compactness and a wide angle of view are accomplished, the zoom ratio is about four or five, so that the request for a higher zoom ratio has not been satisfied.

SUMMARY OF THE INVENTION

The present invention is made in view of the aforementioned problems and has an object to provide a zoom lens system having higher optical performance preferably correcting various aberrations with accomplishing both compactness and a high zoom ratio.

According to one aspect of the present invention, a zoom lens system includes, in order from an object, a first lens group having positive refractive power, a second lens group having negative refractive power, a third lens group having positive refractive power, and a fourth lens group having positive refractive power. When a state of lens group positions varies from a wide-angle end state to a telephoto end state, a distance between the first lens group and the second lens group increases, a distance between the second lens group and the third lens group decreases, and a distance between the third lens group and the fourth lens group varies, and the fourth lens group moves along a zoom trajectory having a convex shape facing to an image.

In one preferred embodiment of the present invention, when the state of lens group positions varies from the wide-angle end state to the telephoto end state, the first lens group preferably moves to the object.

In one preferred embodiment of the present invention, the following conditional expression (1) is preferably satisfied:

$$0.003 < (\Delta 4a + \Delta 4b)/TLt < 0.1 \tag{1}$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

In one preferred embodiment of the present invention, the following conditional expression (2) is preferably satisfied:

$$0.003 < \Delta 4a/(fT-fW) < 0.1 \tag{2}$$

where fT denotes the focal length of the zoom lens system in the telephoto end state, and fW denotes the focal length of the zoom lens system in the wide-angle end state.

In one preferred embodiment of the present invention, the following conditional expression (3) is preferably satisfied:

$$0.003 < \Delta 4b/(fT-fW) < 0.1 \tag{3}$$

In one preferred embodiment of the present invention, the following conditional expression (4) is preferably satisfied:

$$0.005 < M \cdot (\Delta 4a + \Delta 4b)/f4 < 2 \tag{4}$$

where f4 denotes the focal length of the fourth lens group, and M denotes a zoom ratio of the zoom lens system.

In one preferred embodiment of the present invention, the following conditional expression (5) is preferably satisfied:

$$0.5 < fM/(fW \cdot fT)^{1/2} < 1.4 \tag{5}$$

where fM denotes the focal length where the fourth lens group locates the most image side position.

In one preferred embodiment of the present invention, the following conditional expression (6) is preferably satisfied:

$$0.3 < \Delta 4b/\Delta 4a < 3.0 \tag{6}$$

According to another aspect of the present invention, a zoom lens system includes, in order from an object, a first lens group having positive refractive power, a second lens group having negative refractive power, a third lens group having positive refractive power and a fourth lens group having positive refractive power. When a state of lens group positions varies from a wide-angle end state to a telephoto end state, a distance between the first lens group and the second lens group varies, a distance between the second lens group and the third lens group varies, a distance between the third lens group and the fourth lens group varies, and the fourth lens group moves along a zoom trajectory having a convex shape facing to an image.

Other features and advantages according to the invention will be readily understood from the detailed description of the preferred embodiment in conjunction with the accompanying drawings.

BRIEF DESCRIPTION OF THE DRAWINGS

FIGS. 3A and 3B are graphs showing various aberrations of the zoom lens system according to Example 1 of the present invention in which FIG. 3A shows various aberrations in the wide-angle end state W, and FIG. 3B shows those in the first intermediate focal length state M1.

FIGS. 4A and 4B are graphs showing various aberrations of the zoom lens system according to Example 1 of the present invention in which FIG. 4A shows those in the second intermediate focal length state M2, and FIG. 4B shows those in the telephoto end state T.

FIGS. 6A and 6B are graphs showing various aberrations of the zoom lens system according to Example 2 of the present invention in which FIG. 6A shows various aberrations in the wide-angle end state W, and FIG. 6B shows those in the first intermediate focal length state M1.

FIGS. 7A and 7B are graphs showing various aberrations of the zoom lens system according to Example 2 of the present invention in which FIG. 7A shows those in the second intermediate focal length state M2, and FIG. 7B shows those in the telephoto end state T.

FIGS. 9A and 9B are graphs showing various aberrations of the zoom lens system according to Example 3 of the present invention in which FIG. 9A shows various aberrations in the wide-angle end state W, and FIG. 9B shows those in the first intermediate focal length state M1.

FIGS. 10A and 10B are graphs showing various aberrations of the zoom lens system according to Example 3 of the present invention in which FIG. 10A shows those in the second intermediate focal length state M2, and FIG. 10B shows those in the telephoto end state T.

DESCRIPTION OF THE MOST PREFERRED EMBODIMENTS

Figure 1:
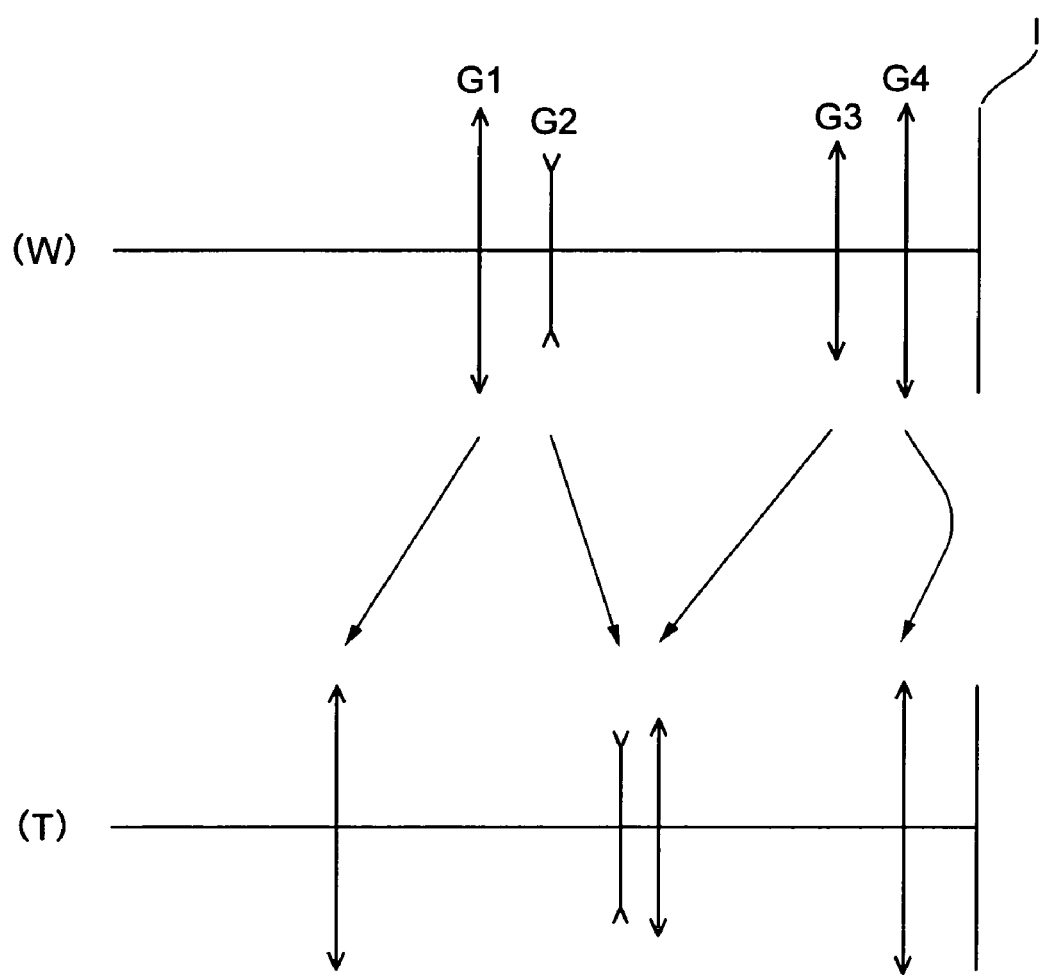
FIG. 1 is a diagram showing lens power arrangement of a zoom lens system according to each Example of the present invention together with movement of each lens group.

Embodiments of the present invention are explained below with reference to accompanying drawings.

A zoom lens system according to the present invention includes, in order from an object, a first lens group having positive refractive power, a second lens group having negative refractive power, a third lens group having positive refractive power, and a fourth lens group having positive refractive power. An aperture stop is disposed to the object side of the third lens group. When a state of lens group positions varies from a wide-angle end state to a telephoto end state, the first, second, third, and fourth lens groups move along the optical axis, and the fourth lens group moves at first to an image side and then to the object side from about an intermediate focal length state forming the zoom trajectory having a convex shape facing to an image.

In a conventional four-lens-group zoom lens system with a fixed fourth lens group, the total lens length increases as increasing the zoom ratio. When applying the restrictions of the lens diameter or the total lens length, optical performance of the zoom lens system has broken down.

On the other hand, in a zoom lens system according to the present invention, when a state of lens group positions varies from the wide-angle end state to the telephoto end state, by moving the fourth lens group in a trajectory having a convex shape facing to the image, the total lens length and the lens diameter of the front lens of the zoom lens system can be drastically decreased, so that the zoom lens system can accomplish both compactness of the lens barrel and a high zoom ratio with securing high optical performance.

In the zoom lens system according to the present invention, the first lens group preferably moves to the object upon zooming from the wide-angle end state to the telephoto end state.

When the zoom ratio becomes high, change in the angle of view from the wide-angle end state to the telephoto end state becomes large, so that when the total lens length is made the same and the first lens group is fixed, the lens diameter of the front lens becomes large upon securing the angle of view in the wide-angle end state. Accordingly, it becomes difficult to make it compact.

On the other hand, in the zoom lens system according to the present invention, by making the first lens group movable and the total lens length variable, the lens barrel of the zoom lens system can be made compact.

In the zoom lens system according to the present invention, the following conditional expression (1) is preferably satisfied:

$$0.003 < (\Delta 4a + \Delta 4b)/TLt < 0.1 \qquad (1)$$

where $\Delta 4a$ denotes the absolute value of the moving amount of the fourth lens group along the optical axis from the wide-angle end state to a focal length state where the fourth lens group locates the most image side position upon focusing on infinity, $\Delta 4b$ denotes the absolute value of the moving amount of the fourth lens group along the optical axis from the focal length state where the fourth lens group locates the most image side position to the telephoto end state upon focusing on infinity, and TLt denotes the total lens length of the zoom lens system in the telephoto end state. By the way, the total lens length means the distance along the optical axis between the most object side of the first lens group to the image plane.

Conditional expression (1) defines an appropriate range of the ratio of the moving amount of the fourth lens group along the optical axis to the total lens length of the zoom lens system in the telephoto end state. When the ratio ($\Delta 4a + \Delta 4b$)/TLt is equal to or falls below the lower limit of conditional expression (1), the total lens length becomes large, so that it becomes impossible to accomplish compactness of the lens barrel. On the other hand, when the ratio ($\Delta 4a + \Delta 4b$)/TLt is equal to or exceeds the upper limit of conditional expression (1), the moving amount of the fourth lens group along the optical axis becomes large and the total lens length cannot be kept compact, so that compactness of the lens barrel cannot be accomplished in addition to affect zooming speed. In order to secure the effect of the present invention, it is preferable to set the lower limit of conditional expression (1) to 0.006 and the upper limit to 0.07.

In the zoom lens system according to the present invention, the following conditional expression (2) is preferably satisfied:

$$0.003 < \Delta 4a/(fT - fW) < 0.1 \qquad (2)$$

where fW denotes the focal length of the zoom lens system in the wide-angle end state, and fT denotes the focal length of the zoom lens system in the telephoto end state.

Conditional expression (2) defines an appropriate range of the moving amount of the fourth lens group along the optical axis from the wide-angle end state to a focal length state where the fourth lens group locates the most image side position upon focusing on infinity. When the ratio Δ4a/(fT−fW) is equal to or falls below the lower limit of conditional expression (2), the optical performance in the intermediate focal length state brakes down. On the other hand, when the ratio Δ4a/(fT−fW) is equal to or exceeds the upper limit of conditional expression (2), the moving amount of the fourth lens group along the optical axis becomes large, so that it is not preferable for constructing the lens barrel. In order to securing the effect of the present invention, it is preferable to set the lower limit of conditional expression (2) to 0.005 and the upper limit to 0.07.

In the zoom lens system according to the present invention, the following conditional expression (3) is preferably satisfied:

$$0.003 < \Delta 4b/(fT-fW) < 0.1 \qquad (3).$$

Conditional expression (3) defines an appropriate range of the moving amount of the fourth lens group along the optical axis from a focal length state where the fourth lens group locates the most image side position to the telephoto end state upon focusing on infinity. When the ratio Δ4b/(fT−fW) is equal to or falls below the lower limit of conditional expression (3), optical performance in the intermediate focal length state and in the telephoto end state brakes down. On the other hand, when the ratio Δ4b/(fT−fW) is equal to or exceeds the upper limit of conditional expression (3), the moving amount of the fourth lens group along the optical axis becomes large, so that it is not preferable for constructing the lens barrel. In order to secure the effect of the present invention, it is preferable to set the lower limit of conditional expression (3) to 0.005 and the upper limit to 0.07.

In the zoom lens system according to the present invention, the following conditional expression (4) is preferably satisfied:

$$0.005 < M \cdot (\Delta 4a + \Delta 4b)/f4 < 2 \qquad (4)$$

where f4 denotes the focal length of the fourth lens group, and M denotes a zoom ratio of the zoom lens system.

Conditional expression (4) defines the moving amount of the fourth lens group along the optical axis by the focal length of the fourth lens group and the zoom ratio. When the ratio M·(Δ4a+Δ4b)/f4 is equal to or falls below the lower limit of conditional expression (4), it becomes difficult to secure optical performance over entire zoom range from the wide-angle end state to the telephoto end state and a high zoom ratio cannot be accomplished. On the other hand, when the ratio M·(Δ4a+Δ4b)/f4 is equal to or exceeds the upper limit of conditional expression (4), the moving amount of the fourth lens group along the optical axis becomes large, so that it is not preferable for constructing the lens barrel. In order to secure the effect of the present invention, it is preferable to set the lower limit of conditional expression (4) to 0.1 and the upper limit to 1.4.

In the zoom lens system according to the present invention, the following conditional expression (5) is preferably satisfied:

$$0.5 < fM/(fW \cdot fT)^{1/2} < 1.4 \qquad (5)$$

where fM denotes a focal length where the fourth lens group locates the most image side position.

Conditional expression (5) defines an appropriate range of the focal length state where the fourth lens group locates the most image side position. When the ratio $fM/(fW \cdot fT)^{1/2}$ is equal to or falls below the lower limit of conditional expression (5), spherical aberration and astigmatism come to deteriorate in the intermediate focal length state, so that optical performance cannot be secured over entire zoom range. On the other hand, when the ratio $fM/(fW \cdot fT)^{1/2}$ is equal to or exceeds the upper limit of conditional expression (5), a high zoom ratio cannot be accomplished. In order to secure the effect of the present invention, it is preferable to set the lower limit of conditional expression (5) to 0.6 and the upper limit to 1.2.

In the zoom lens system according to the present invention, the following conditional expression (6) is preferably satisfied:

$$0.3 < \Delta 4b/\Delta 4a < 3.0 \qquad (6).$$

Conditional expression (6) defines a ratio of the moving amount of the fourth lens group along the optical axis from the wide-angle end state to a focal length state where the fourth lens group locates to the most image side to that from the focal length state where the fourth lens group locates to the most image side to the telephoto end state upon focusing on infinity. When the ratio Δ4b/Δ4a is equal to or falls below the lower limit of conditional expression (6) or exceeds the upper limit of conditional expression (6), the total lens length becomes large, so that it becomes impossible to accomplish compactness of the lens barrel. In order to secure the effect of the present invention, it is preferable to set the lower limit of conditional expression (6) to 0.6 and the upper limit to 1.5.

In the zoom lens system according to the present invention, focusing from infinity to a close object is carried out by moving the fourth lens group to the object side. By the way, focusing can be carried out by moving the first lens group, the second lens group, or the fourth lens group. Or focusing may be carried out by extending the whole lens system in a body. Alternatively, focusing may be carried out by moving the image plane. In the configuration of the lens barrel, it is more convenient to carry out focusing by moving the fourth lens group.

Embodiment

Each example of a zoom lens system according to the present invention is explained below with reference to accompanying drawings.

FIG. 1 is a diagram showing lens power arrangement of a zoom lens system according to each example of the present invention together with movement of each lens group.

In FIG. 1, a zoom lens system according to each example of the present invention includes, in order from an object, a first lens group G1 having positive refractive power, a second lens group G2 having negative refractive power, a third lens group G3 having positive refractive power, and a fourth lens group G4 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 varies, and the fourth lens group G4 moves in a trajectory having a convex shape facing to the image plane I.

EXAMPLE 1

Figure 2:
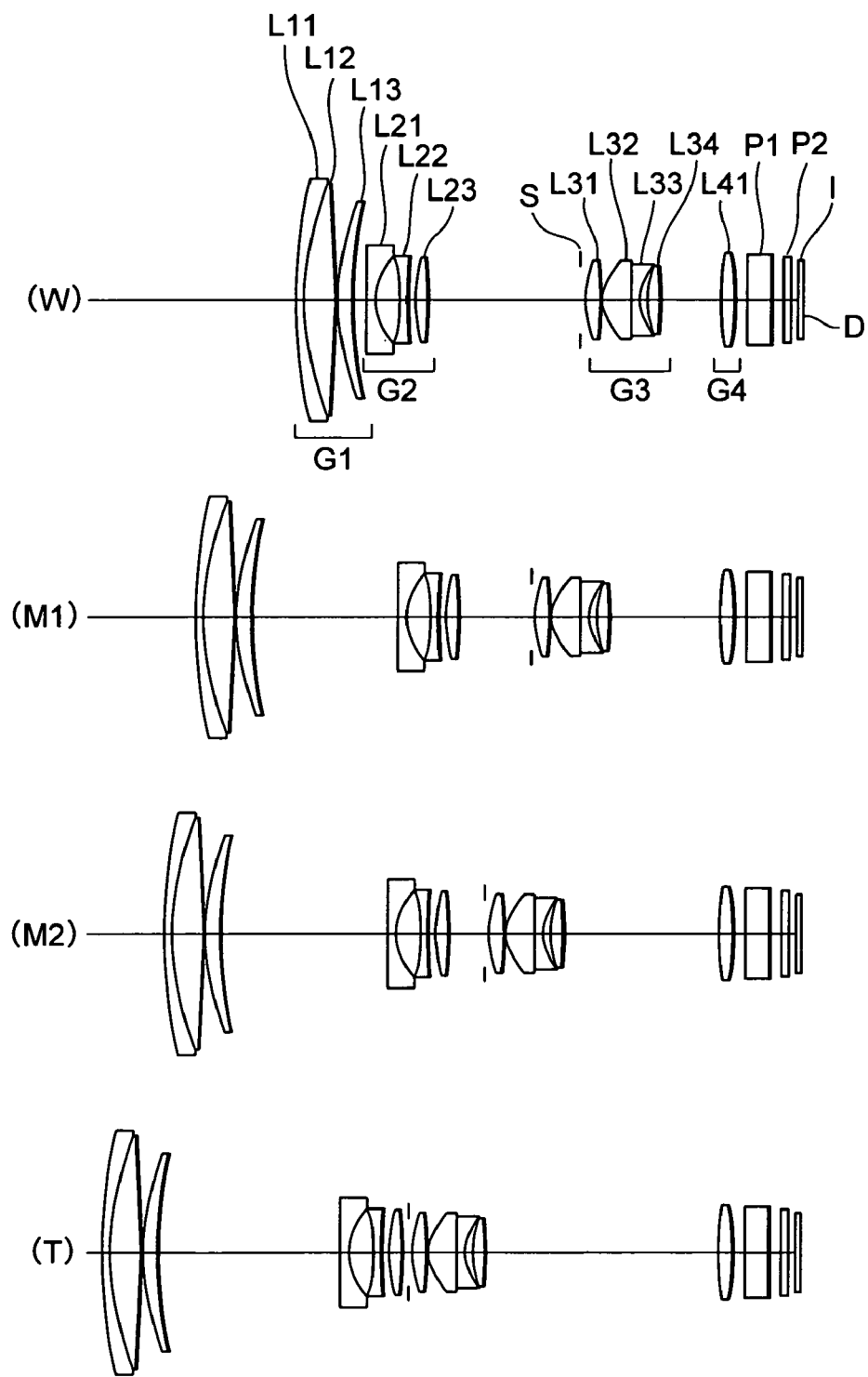
FIG. 2 is diagrams showing the lens arrangement of a zoom lens system according to Example 1 of the present invention in which (W) is a wide-angle end state, (M1) is a first intermediate focal length state, (M2) is a second intermediate focal length state, and (T) is a telephoto end state.

FIG. 2 is diagrams showing the lens arrangement of a zoom lens system according to Example 1 of the present invention in which (W) is a wide-angle end state, (M1) is a first intermediate focal length state, (M2) is a second intermediate focal length state, and (T) is a telephoto end state. Reference symbols showing each lens element used for explanation below are attached only to the diagram showing the wide-angle end state (W) and duplication is omitted to other diagrams. The same rule is applied to other examples.

A zoom lens system according to Example 1 of the present invention is composed of, in order from the object, a first lens group G1 having positive refractive power, a second lens group G2 having negative refractive power, an aperture stop S, a third lens group G3 having positive refractive power, and a fourth lens group G4 having positive refractive power.

The first lens group G1 having positive refractive power as a whole is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 having negative refractive power as a whole is composed of, in order from the object, a negative meniscus lens L21 having a convex surface facing to the object, a double concave negative lens L22, and a double convex positive lens L23.

The third lens group G3 having positive refractive power as a whole is composed of, in order from the object, a double convex positive lens L31, a cemented lens constructed by a double convex positive lens L32 cemented with a double concave negative lens L33, and a double convex positive lens L34.

The fourth lens group G4 is composed of a double convex positive lens L41.

The aperture stop S is disposed to the object side of the third lens group G3 and moved with the third lens group G3 in a body. In the following Examples including Example 1, a low-pass filter P1 for cutting off the spatial frequency over the resolution limit of a solid-state imaging device D such as a CCD disposed in the image plane I and a cover glass P2 for protecting the solid-state imaging device D are disposed between the fourth lens group G4 and the image plane I.

Various values according to Example 1 are shown in Table 1. In [Specifications], f denotes the focal length, Bf denotes a back focal length, FNO denotes an f-number, and $2\omega$ denotes an angle of view (unit: degrees). In [Lens Data], the first column shows the surface number that is a lens surface counted in order from the object, r denotes the radius of curvature, d denotes a distance between the lens surfaces, ν denotes Abbe number at d-line ($\lambda$=587.6 nm), and n denote refractive index at d-line ($\lambda$=587.56 nm). By the way, r=∞ denotes a plane surface. Refractive index for the air=1.000000 is omitted. In [Aspherical Data], each aspherical coefficient is shown as the aspherical surface is expressed by the following expression:

$$X(y)=y^2/[r\cdot\{1+(1-ky^2/r^2)^{1/2}\}]+C4\cdot y^4+C6\cdot y^6+C8\cdot y^8+C10\cdot y^{10}$$

where y denotes a height from the optical axis, X(y) denotes a distance along the optical axis from tangent plane at the vertex of the aspherical surface to the aspherical surface at the height y, r denotes a reference radius of curvature (paraxial radius of curvature), K denotes a conical coefficient, and Ci denote i-th order aspherical coefficient, respectively. An aspherical surface is denoted by an asterisk (*) attached to the surface number. In [Aspherical Data], "E–n" denotes "$10^{-n}$". In [Specifications] and [Variable Distances], focal length f, back focal length Bf, f-number FNO, and angle of view $2\omega$, or variable distances are shown in the wide-angle end state W, in the first intermediate focal length state M1, in the second intermediate focal length state M2, and in the telephoto end state T. In [Values for Conditional Expressions], values corresponding to respective conditional expressions are shown.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

[Specifications]

| | W | M1 | M2 | T |
|---|---|---|---|---|
| f = | 6.3 | 19 | 30 | 47.9 |
| Bf = | | 0.69473 (constant) | | |
| FNO = | 2.6 | 3.35 | 3.97 | 5.09 |
| 2ω = | 61.28° | 20.16° | 13.1° | 8.38° |

[Lens Data]

| | r | d | ν | n |
|---|---|---|---|---|
| 1 | 50.7928 | 0.8 | 23.78 | 1.84666 |
| 2 | 29.1817 | 3.2 | 65.47 | 1.603 |
| 3 | −99.7222 | 0.1 | | |
| 4 | 27.5451 | 1.5 | 52.32 | 1.755 |
| 5 | 46.2007 | (d5) | | |
| 6 | 1540.7477 | 0.8 | 54.66 | 1.72916 |
| 7 | 6.173 | 2.5 | | |
| 8 | −13.4291 | 0.8 | 52.32 | 1.755 |
| 9 | 44.8085 | 0.5709 | | |
| 10 | 16.6858 | 1.4 | 23.78 | 1.84666 |
| 11 | −109.8483 | (d11) | | |
| 12 | ∞ | 0.4 | Aperture Stop S | |
| 13* | 10.3942 | 1.6 | 61.3 | 1.58913 |
| 14 | −36.1395 | 0.1 | | |
| 15 | 5.0319 | 2.8 | 81.61 | 1.497 |
| 16 | −14777.27 | 0.8 | 34.96 | 1.801 |
| 17 | 4.3296 | 0.8 | | |
| 18* | 11.9583 | 1.3 | 81.61 | 1.497 |
| 19 | −63.0093 | (d19) | | |
| 20 | 45 | 1.5 | 55.52 | 1.6968 |
| 21 | −23.7314 | (d21) | | |
| 22 | ∞ | 2.62 | 64.14 | 1.51633 |
| 23 | ∞ | 1 | | |
| 24 | ∞ | 0.75 | 64.14 | 1.51633 |
| 25 | ∞ | (Bf) | | |

[Aspherical Data]

Surface Number 13

κ = 0.3146
C4 = 1.00000E−10
C6 = 2.45500E−07
C8 = 1.00000E−14
C10 = 2.80780E−09

Surface Number 18

κ = −2.4380
C4 = −3.28540E−04
C6 = 1.00000E−12
C8 = −3.36790E−06
C10 = 1.00000E−16

[Variable Distances]

| | W | M1 | M2 | T |
|---|---|---|---|---|
| f | 6.3000 | 19.0000 | 30.0000 | 47.9000 |
| d5 | 1.2792 | 14.1146 | 16.3701 | 17.6261 |

TABLE 1-continued

| | | | | |
|---|---|---|---|---|
| d11 | 15.0028 | 7.0057 | 3.4784 | 0.5110 |
| d19 | 6.0133 | 11.1419 | 15.2478 | 22.7085 |
| d21 | 0.9257 | 0.6354 | 0.8620 | 0.9257 |

[Values for Conditional Expressions]

| | |
|---|---|
| (1): (Δ4a + Δ4b)/TLt = | 0.009 |
| (2): Δ4a/(fT − fW) = | 0.007 |
| (3): Δ4b/(fT − fW) = | 0.007 |
| (4): M(Δ4a + Δ4b)/f4 = | 0.196 |
| (5): fM/(fW · fT)$^{1/2}$ = | 1.094 |
| (6): Δ4b/Δ4a = | 0.916 |

Figure 3A:
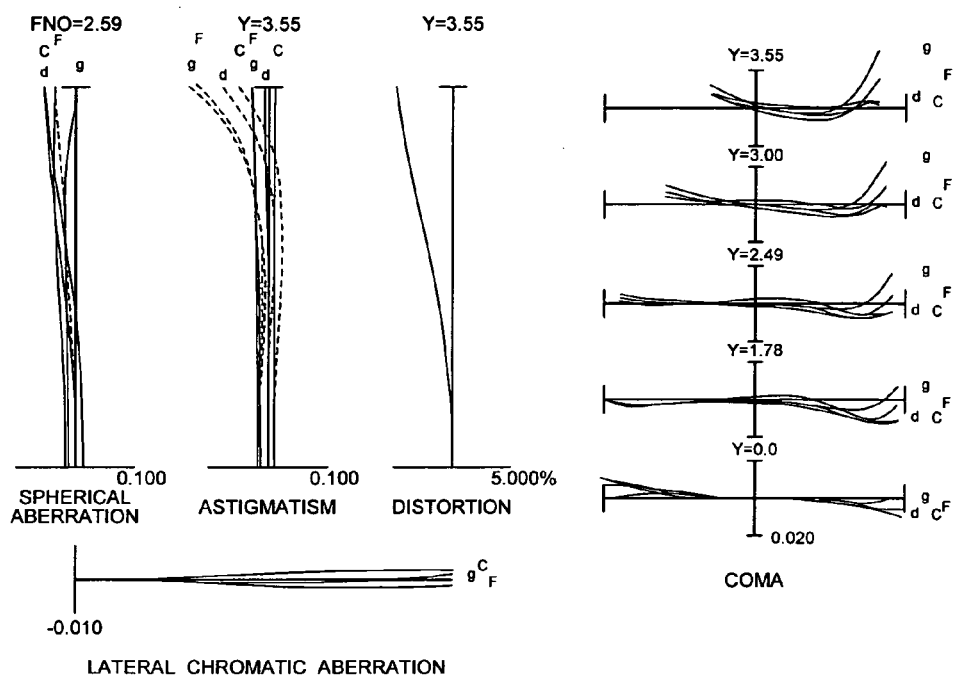
Figure 3B:
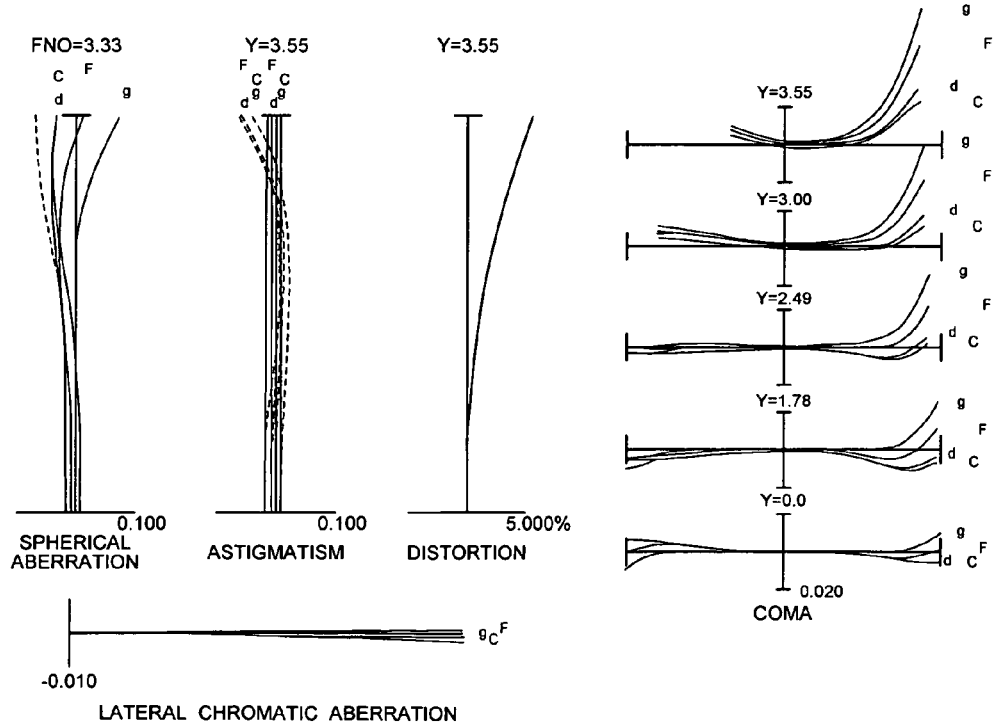
Figure 4A:
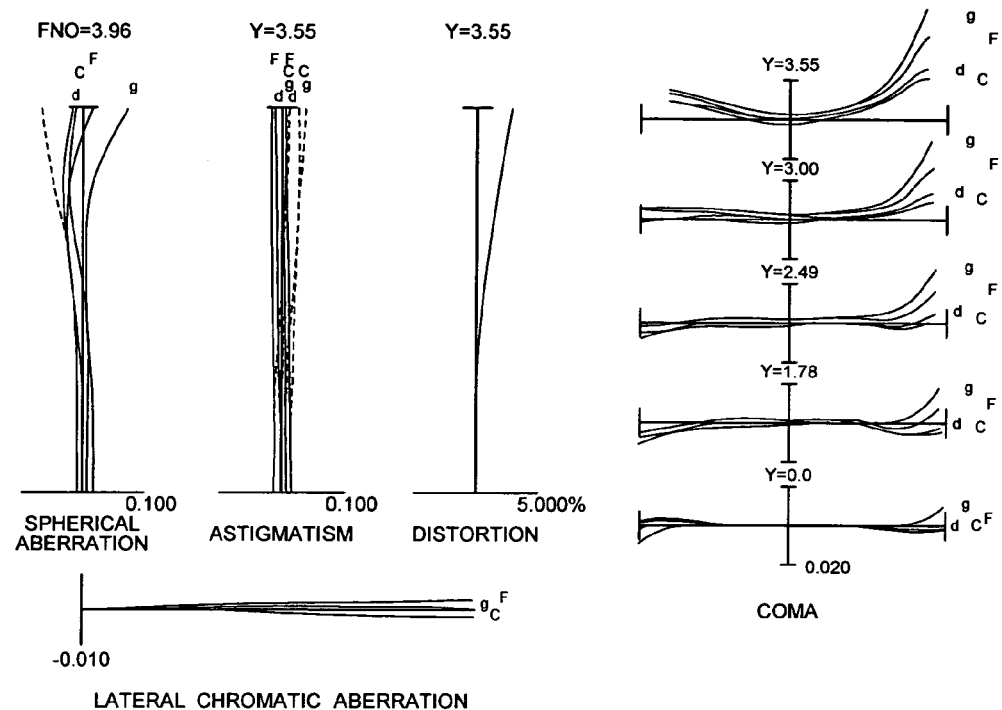
Figure 4B:
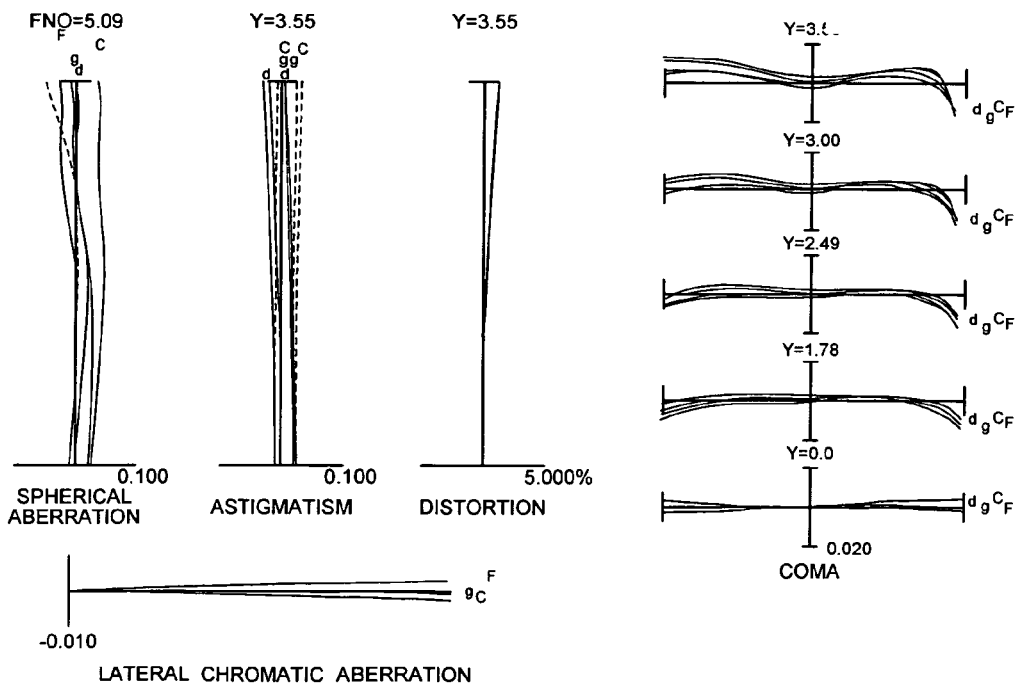

FIGS. 3A through 4B are graphs showing various aberrations of the zoom lens system according to Example 1 of the present invention in which FIG. 3A shows various aberrations in the wide-angle end state W, FIG. 3B shows those in the first intermediate focal length state M1, FIG. 4A shows those in the second intermediate focal length state M2, and FIG. 4B shows those in the telephoto end state T.

In respective graphs, FNO denotes an f-number, Y denotes an image height, C denote aberration curve at C-line (λ=656.3 nm), d denotes aberration curve at d-line (587.6 nm), F denotes aberration curve at F-line (λ=486.1 nm), and g denotes aberration curve at g-line (λ=435.8 nm). In graphs showing spherical aberration, f-number shows the value at the maximum aperture and a solid line indicates spherical aberration and a broken line indicates sine condition. In the graphs showing astigmatism and distortion, Y denotes the maximum value of the image height. In the graph showing coma, Y denotes the value of each image height. In the graph showing astigmatism, a solid line indicates a sagittal image plane and a broken line indicates a meridional plane. The above-described explanation regarding various aberration graphs is the same as the other examples.

As is apparent from the respective graphs, the zoom lens system according to Example 1 shows superb optical performance as a result of good corrections to various aberrations in each focal length state from the wide-angle end state to the telephoto end state.

EXAMPLE 2

Figure 5:
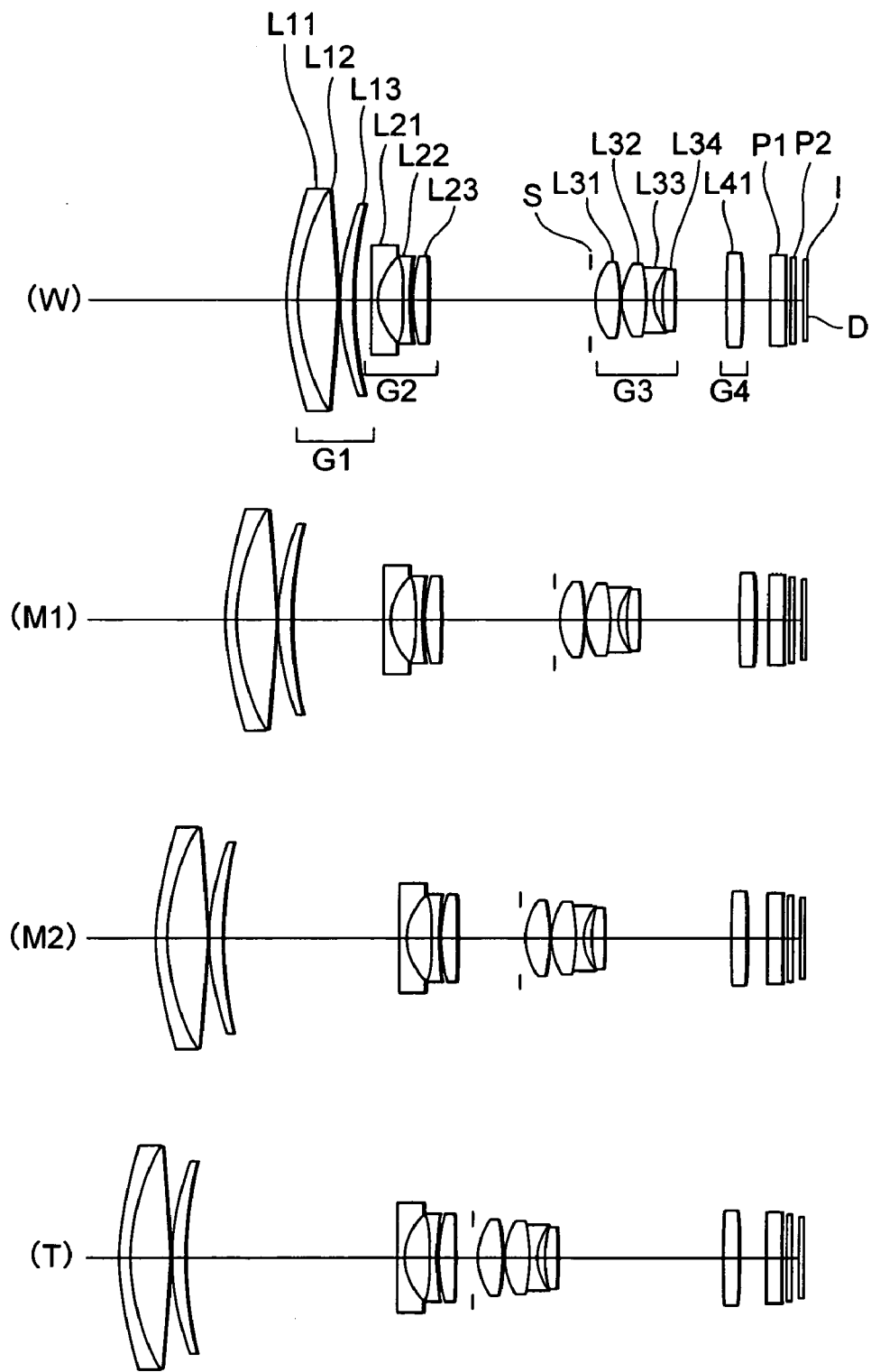
FIG. 5 is diagrams showing the lens arrangement of a zoom lens system according to Example 2 of the present invention in which (W) is a wide-angle end state, (M1) is a first intermediate focal length state, (M2) is a second intermediate focal length state, and (T) is a telephoto end state.

FIG. 5 is diagrams showing the lens arrangement of a zoom lens system according to Example 2 of the present invention in which (W) is a wide-angle end state, (M1) is a first intermediate focal length state, (M2) is a second intermediate focal length state, and (T) is a telephoto end state.

In FIG. 5, the zoom lens system according to Example 2 of the present invention is composed of, in order from an object, a first lens group G1 having positive refractive power, a second lens group G2 having negative refractive power, an aperture stop S, a third lens group G3 having positive refractive power, and a fourth lens group G4 having positive refractive power.

The first lens group G1 having positive refractive power as a whole is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 having negative refractive power as a whole is composed of, in order from the object, a double concave negative lens L21, a double concave negative lens L22, and a double convex positive lens L23.

The third lens group G3 having positive refractive power as a whole is composed of, in order from the object, a double convex positive lens L31, a cemented lens constructed by a double convex positive lens L32 cemented with a double concave negative lens L33, and a double convex positive lens L34.

The fourth lens group G4 is composed of a double convex positive lens L41.

The aperture stop S is disposed to the object side of the third lens group G3 and moved with the third lens group G3 in a body.

Various values according to Example 2 are shown in Table 2.

TABLE 2

[Specifications]

| | W | M1 | M2 | T |
|---|---|---|---|---|
| f = | 6.3 | 11.98 | 26.88 | 48 |
| Bf = | 0.61 | 0.59 | 0.578 | 0.588 |
| FNO = | 2.77 | 3.41 | 3.97 | 4.62 |
| 2ω = | 64.04° | 33.27° | 15.12° | 8.66° |

[Lens Data]

| | r | d | ν | n |
|---|---|---|---|---|
| 1 | 34.1194 | 0.95 | 27.51 | 1.7552 |
| 2 | 21.333 | 4 | 81.61 | 1.497 |
| 3 | −84.5256 | 0.1 | | |
| 4 | 27.3623 | 1.4 | 46.58 | 1.804 |
| 5 | 39.1831 | (d5) | | |
| 6 | −198.4493 | 0.8 | 46.63 | 1.816 |
| 7 | 6.0301 | 2.3 | | |
| 8 | −17.2496 | 0.8 | 54.66 | 1.72916 |
| 9 | 23.9597 | 0.1 | | |
| 10 | 12.3105 | 1.7 | 23.78 | 1.84666 |
| 11 | −133.3487 | (d11) | | |
| 12 | ∞ | 0.4 | Aperture Stop S | |
| 13* | 6.171 | 2.5 | 63.4 | 1.51606 |
| 14* | −17.8808 | 0.1 | | |
| 15 | 6.6043 | 2.4 | 81.61 | 1.497 |
| 16 | −12.2878 | 0.8 | 34.96 | 1.801 |
| 17 | 4.4511 | 0.8 | | |
| 18 | 16.55 | 1.3 | 43.69 | 1.72 |
| 19 | −107.2453 | (d19) | | |
| 20 | 65.8729 | 1.8 | 42.72 | 1.83481 |
| 21 | −33.8068 | (d21) | | |
| 22 | ∞ | 1.65 | 64.14 | 1.51633 |
| 23 | ∞ | 0.4 | | |
| 24 | ∞ | 0.5 | 64.14 | 1.51633 |
| 25 | ∞ | (Bf) | | |

[Aspherical Data]

Surface Number 13

κ = 0.3524
C4 = 1.00000E−10
C6 = 1.89790E−06
C8 = −3.88810E−08
C10 = 1.00000E−16

Surface Number 14

κ = −5.3055
C4 = 1.00000E−10
C6 = 2.22080E−06
C8 = −1.37750E−07
C10 = 1.00000E−16

[Variable Distances]

| | W | M1 | M2 | T |
|---|---|---|---|---|
| f | 6.3018 | 11.9795 | 26.8764 | 48.0147 |
| d5 | 1.4040 | 8.5770 | 17.0200 | 20.4410 |

TABLE 2-continued

| | | | | |
|---|---|---|---|---|
| d11 | 15.3660 | 10.8010 | 5.6710 | 1.5920 |
| d19 | 4.8830 | 9.5350 | 12.4690 | 15.9910 |
| d21 | 2.5593 | 1.1192 | 1.6840 | 2.4411 |

[Values for Conditional Expressions]

| | |
|---|---|
| (1): $(\Delta 4a + \Delta 4b)/TLt =$ | 0.041 |
| (2): $\Delta 4a/(fT - fW) =$ | 0.034 |
| (3): $\Delta 4b/(fT - fW) =$ | 0.031 |
| (4): $M(\Delta 4a + \Delta 4b)/f4 =$ | 0.765 |
| (5): $fM/(fW \cdot fT)^{1/2} =$ | 0.689 |
| (6): $\Delta 4b/\Delta 4a =$ | 1.000 |

Figure 6A:
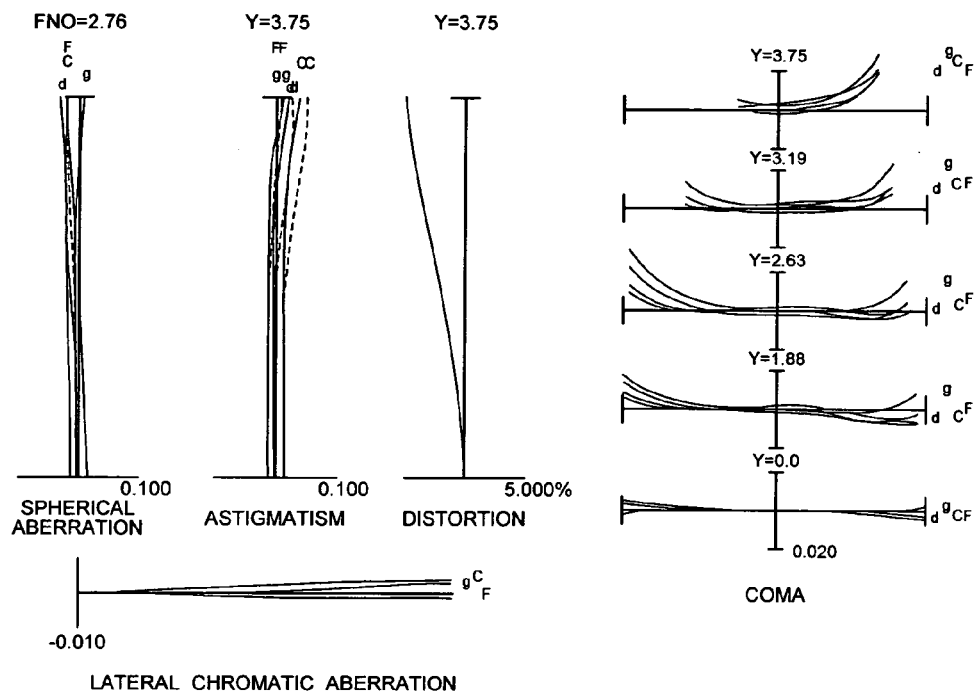
Figure 6B:
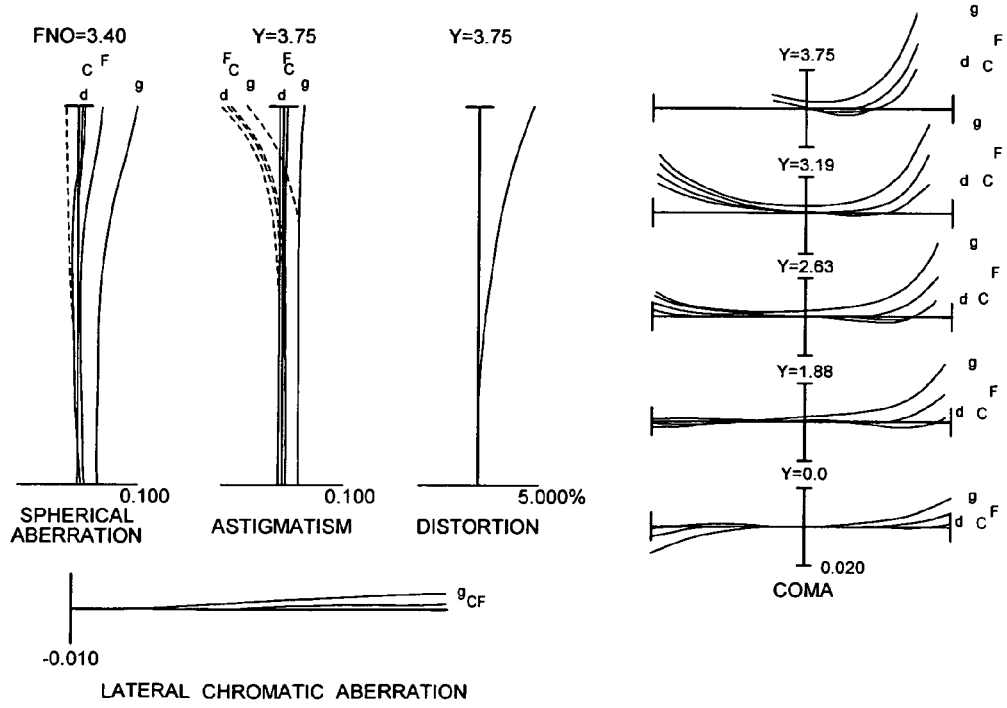
Figure 7A:
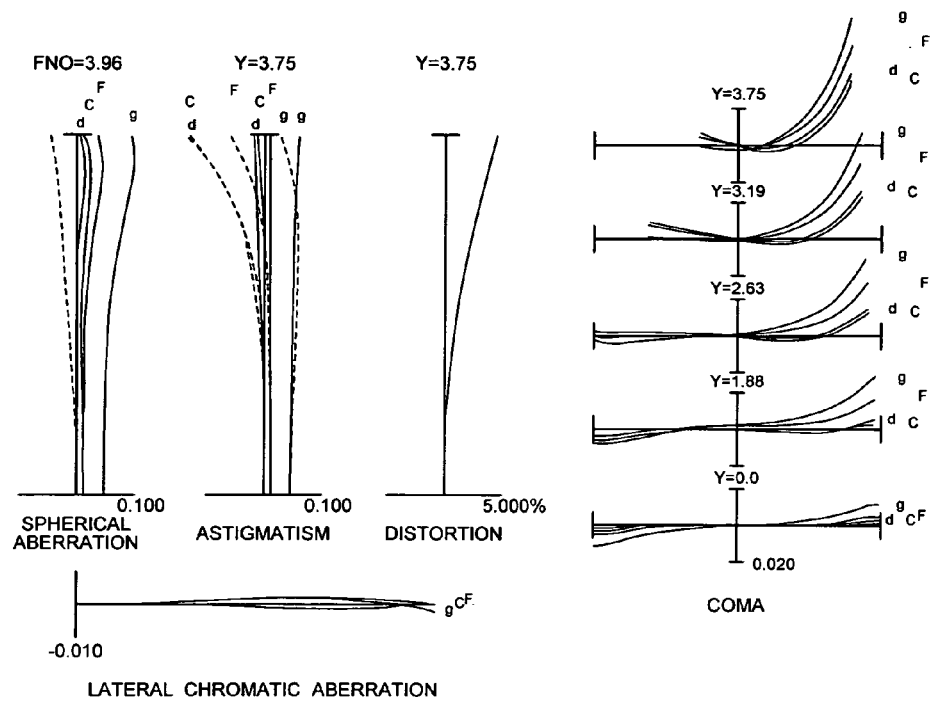
Figure 7B:
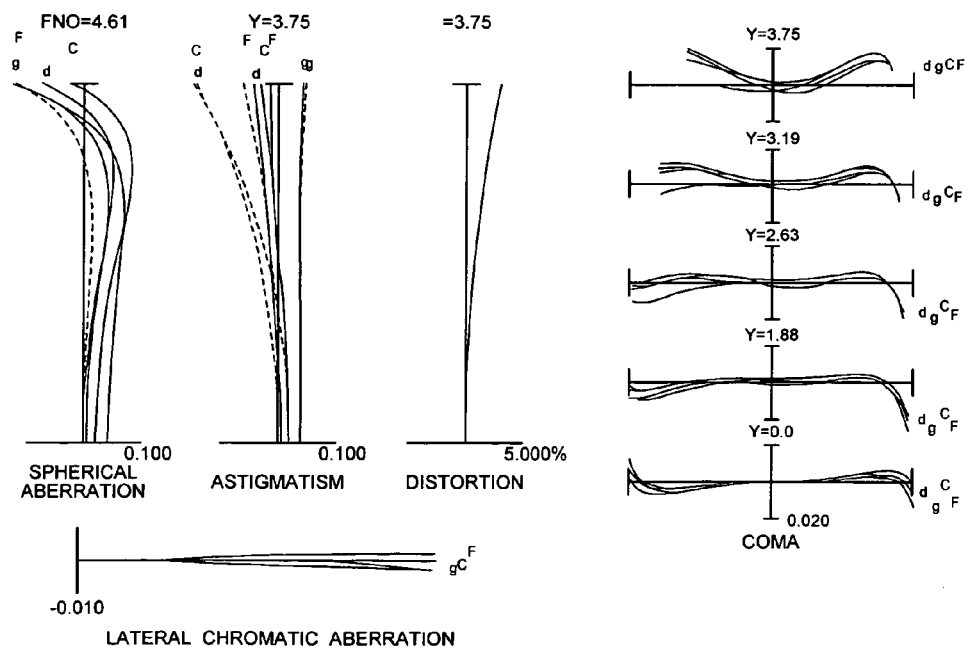

FIGS. 6A through 7B are graphs showing various aberrations of the zoom lens system according to Example 2 of the present invention in which FIG. 6A shows various aberrations in the wide-angle end state W, FIG. 6B shows those in the first intermediate focal length state M1, FIG. 7A shows those in the second intermediate focal length state M2, and FIG. 7B shows those in the telephoto end state T.

As is apparent from the respective graphs, the zoom lens system according to Example 2 shows superb optical performance as a result of good corrections to various aberrations in each focal length state from the wide-angle end state to the telephoto end state.

EXAMPLE 3

Figure 8:
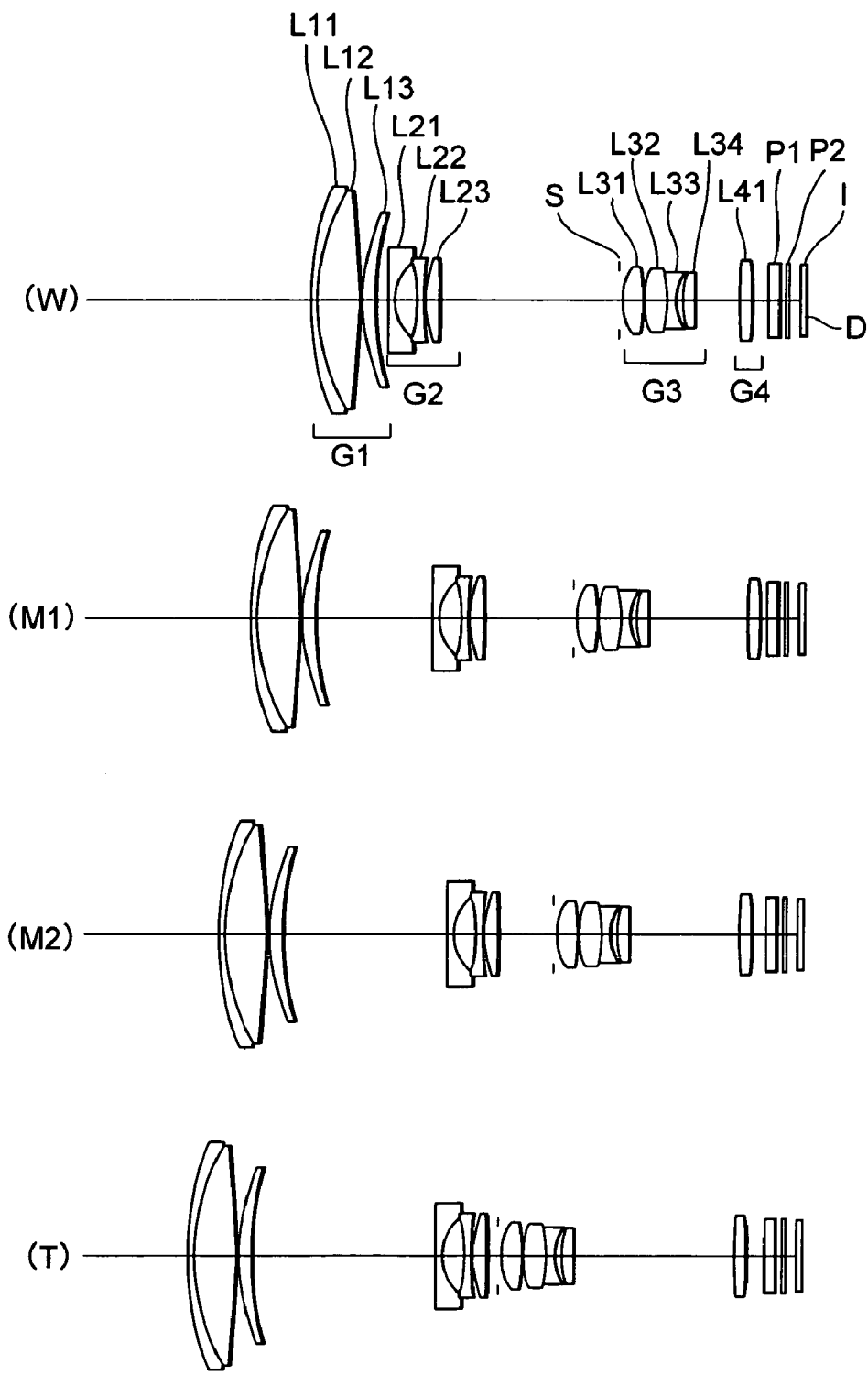
FIG. 8 is diagrams showing the lens arrangement of a zoom lens system according to Example 3 of the present invention in which (W) is a wide-angle end state, (M1) is a first intermediate focal length state, (M2) is a second intermediate focal length state, and (T) is a telephoto end state.

FIG. 8 is diagrams showing the lens arrangement of a zoom lens system according to Example 3 of the present invention in which (W) is a wide-angle end state, (M1) is a first intermediate focal length state, (M2) is a second intermediate focal length state, and (T) is a telephoto end state.

In FIG. 8, the zoom lens system according to Example 3 of the present invention is composed of, in order from an object, a first lens group G1 having positive refractive power, a second lens group G2 having negative refractive power, an aperture stop S, a third lens group G3 having positive refractive power, and a fourth lens group G4 having positive refractive power.

The first lens group G1 having positive refractive power as a whole is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 having negative refractive power as a whole is composed of, in order from the object, a double concave negative lens L21, a double concave negative lens L22, and a double convex positive lens L23.

The third lens group G3 having positive refractive power as a whole is composed of, in order from the object, a double convex positive lens L31, a cemented lens constructed by a double convex positive lens L32 cemented with a double concave negative lens L33, and a positive meniscus lens L34 having a convex surface facing to the object.

The fourth lens group G4 is composed of a double convex positive lens L41.

The aperture stop S is disposed to the object side of the third lens group G3 and moved with the third lens group G3 in a body.

Various values according to Example 3 are shown in Table 3.

TABLE 3

[Specifications]

| | W | M1 | M2 | T |
|---|---|---|---|---|
| f = | 7.5 | 22.22 | 37.5 | 66.53 |
| Bf = | | 1.63127 (constant) | | |
| FNO = | 2.61 | 3.54 | 3.81 | 4.84 |
| 2ω = | 67.83° | 23.14° | 13.84° | 7.95° |

[Lens Data]

| | r | d | ν | n |
|---|---|---|---|---|
| 1 | 45.2848 | 1 | 23.78 | 1.84666 |
| 2 | 31.9444 | 6.3 | 81.61 | 1.497 |
| 3 | −134.5167 | 0.1 | | |
| 4 | 31.8511 | 1.9 | 47.82 | 1.757 |
| 5 | 43.7941 | (d5) | | |
| 6 | −1314.022 | 1 | 46.63 | 1.816 |
| 7 | 8.3694 | 3.19 | | |
| 8 | −20.07 | 1 | 52.32 | 1.755 |
| 9 | 61.8785 | 0.15 | | |
| 10 | 19.536 | 2.2 | 23.78 | 1.84666 |
| 11 | −102.5759 | (d11) | | |
| 12 | ∞ | 0.5 | | Aperture Stop S |
| 13* | 8.3333 | 3.2 | 61.3 | 1.58913 |
| 14* | −32.4601 | 0.1 | | |
| 15 | 14.7517 | 3.5 | 65.47 | 1.603 |
| 16 | −12.7614 | 1.1 | 34.96 | 1.801 |
| 17 | 6.0825 | 1 | | |
| 18 | 13.3827 | 1.8056 | 48.31 | 1.66672 |
| 19 | 104.4609 | (d19) | | |
| 20 | 83.3333 | 2.2222 | 54.66 | 1.72916 |
| 21 | −35.958 | (d21) | | |
| 22 | ∞ | 2 | 64.14 | 1.51633 |
| 23 | ∞ | 0.5 | | |
| 24 | ∞ | 0.5 | 64.14 | 1.51633 |
| 25 | ∞ | (Bf) | | |

[Aspherical Data]

Surface Number 13

κ = 0.3036
C4 = 3.73250E−11
C6 = 1.15480E−06
C8 = −4.03990E−09
C10 = 5.519990E−18

Surface Number 14

κ = −10.8985
C4 = 3.73250E−11
C6 = 1.42300E−06
C8 = −2.18410E−08
C10 = 5.19990E−18

[Variable Distances]

| | W | M1 | M2 | T |
|---|---|---|---|---|
| f | 7.5000 | 22.2222 | 37.5000 | 66.5278 |
| d5 | 1.7063 | 16.8330 | 23.8501 | 26.6560 |
| d11 | 26.2279 | 13.0031 | 7.8690 | 1.6326 |
| d19 | 6.3952 | 14.5234 | 16.1915 | 23.6761 |
| d21 | 2.0482 | 0.4746 | 1.3436 | 2.1096 |

[Values for Conditional Expressions]

| | |
|---|---|
| (1): $(\Delta 4a + \Delta 4b)/TLt =$ | 0.036 |
| (2): $\Delta 4a/(fT - fW) =$ | 0.027 |
| (3): $\Delta 4b/(fT - fW) =$ | 0.028 |
| (4): $M(\Delta 4a + \Delta 4b)/f4 =$ | 0.820 |
| (5): $fM/(fW \cdot fT)^{1/2} =$ | 0.995 |
| (6): $\Delta 4b/\Delta 4a =$ | 1.039 |

Figure 9A:
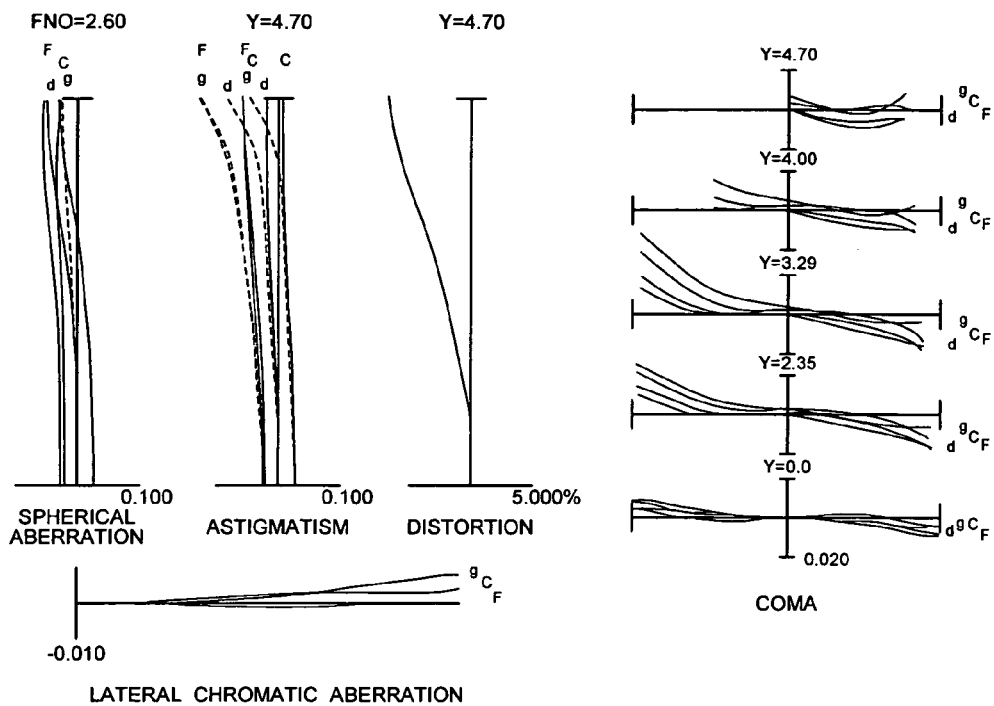
Figure 9B:
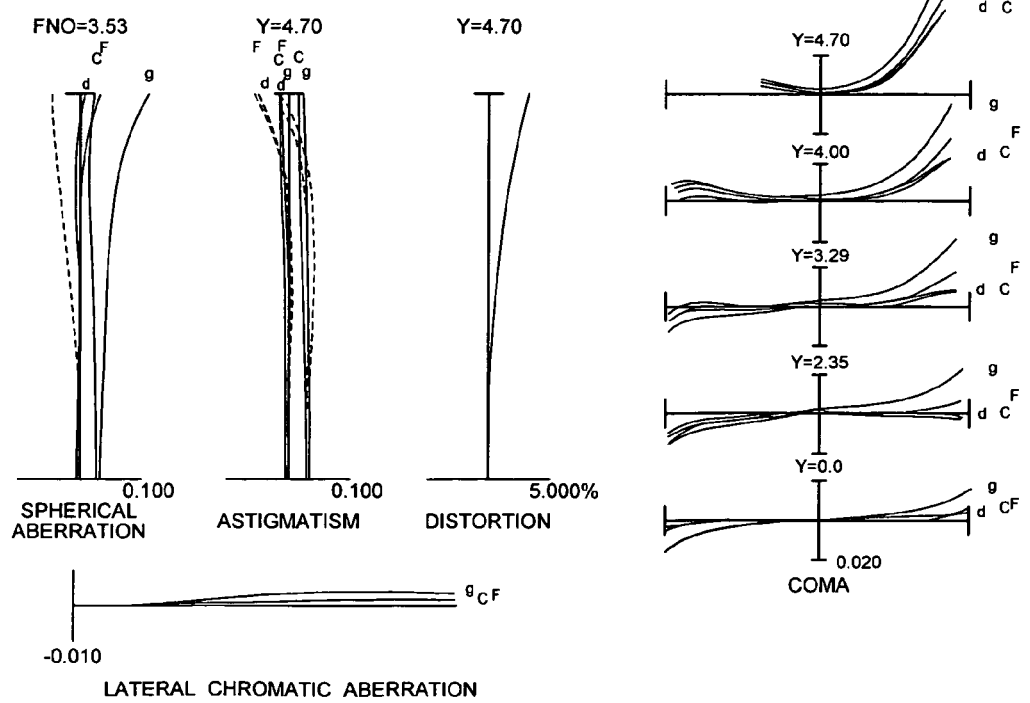
Figure 10A:
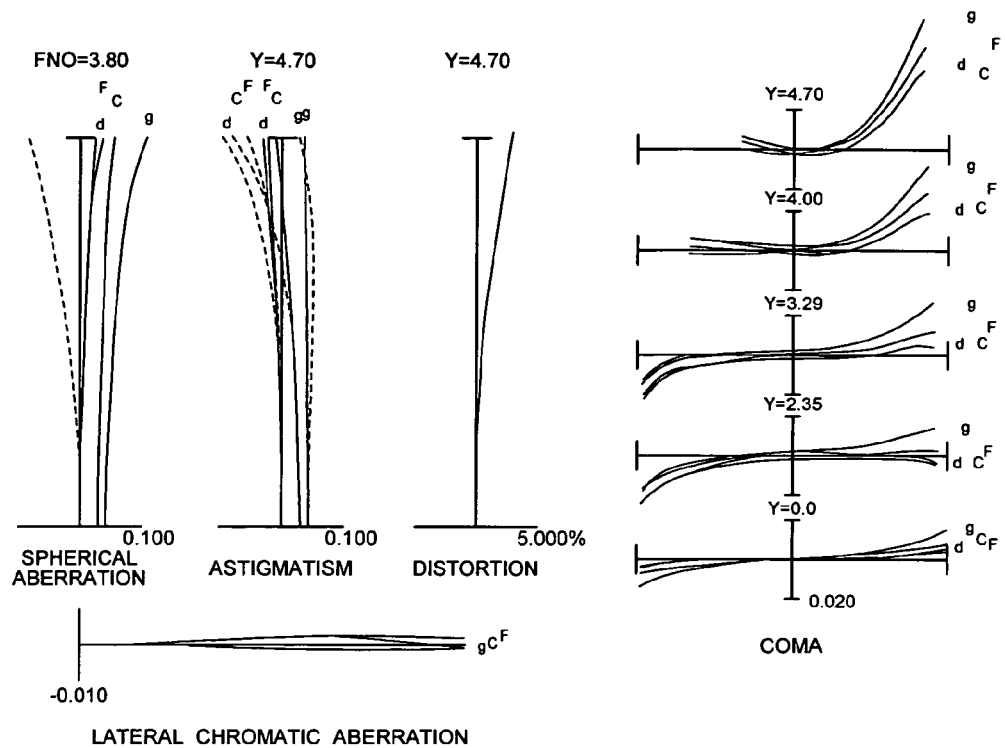
Figure 10B:
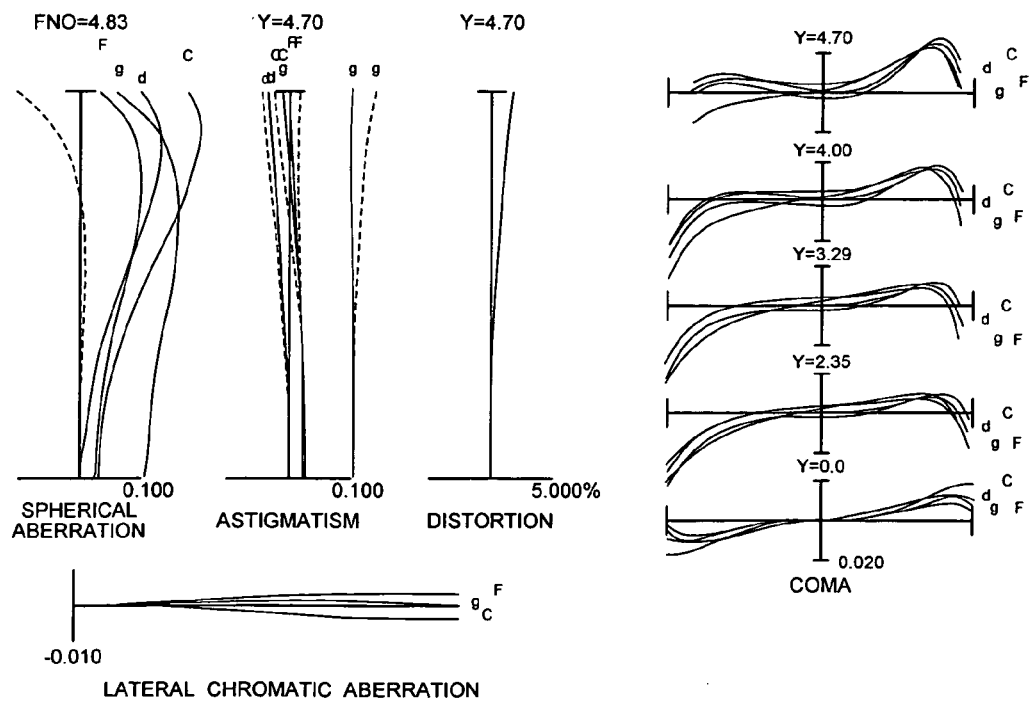

FIGS. 9A through 10B are graphs showing various aberrations of the zoom lens system according to Example 3 of the present invention in which FIG. 9A shows various aberrations in the wide-angle end state W, FIG. 9B shows those in the first intermediate focal length state M1, FIG. 10A shows those in the second intermediate focal length state M2, and FIG. 10B shows those in the telephoto end state T.

As is apparent from the respective graphs, the zoom lens system according to Example 3 shows superb optical performance as a result of good corrections to various aberrations in each focal length state from the wide-angle end state to the telephoto end state.

Incidentally, it is needless to say that although zoom lens systems with a four-lens-group configuration are shown as examples of the present invention, a zoom lens system simply added by a lens group to a four-lens-group configuration is included in the spirit of the present invention. Moreover, in the configuration of each lens group, a lens group simply added by lens elements to the lens group shown in examples is included in the spirit or scope of the present invention.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
    a first lens group having positive refractive power;
    a second lens group having negative refractive power;
    a third lens group having positive refractive power; and
    a fourth lens group having positive refractive power,
    wherein the zoom lens system includes at least one aspherical lens, and
    wherein when a state of lens group positions varies from a wide-angle end state to a telephoto end state, a distance between the first lens group and the second lens group increases, a distance between the second lens group and the third lens group decreases, and a distance between the third lens group and the fourth lens group varies, and the fourth lens group moves along a zoom trajectory having a convex shape facing to an image.

2. The zoom lens system according to claim 1, wherein when the state of lens group positions varies from the wide-angle end state to the telephoto end state, the first lens group moves to the object.

3. The zoom lens system according to claim 2, wherein the following conditional expression is satisfied:

$$0.003 < (\Delta 4a + \Delta 4b)/TLt < 0.1$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

4. The zoom lens system according to claim 3, wherein the following conditional expression is satisfied:

$$0.003 < \Delta 4a/(fT - fW) < 0.1$$

where $\Delta 4a$ denotes an absolute value of a moving amount of the fourth lens group along the optical axis from the wide-angle end state to a focal length state where the fourth lens group locates the most image side position upon focusing on infinity, fT denote the focal length of the zoom lens system in the telephoto end state, and fW denotes the focal length of the zoom lens system in the wide-angle end state.

5. The zoom lens system according to claim 4, wherein the following conditional expression is satisfied:

$$0.003 < \Delta 4b/(fT - fW) < 0.1$$

where $\Delta 4b$ denotes an absolute value of a moving amount of the fourth lens group along the optical axis from the focal length state where the fourth lens group locates the most image side position to the telephoto end state upon focusing on infinity, fT denote the focal length of the zoom lens system in the telephoto end state, and fW denotes the focal length of the zoom lens system in the wide-angle end state.

6. The zoom lens system according to claim 5, wherein the following conditional expression is satisfied:

$$0.005 < M \cdot (\Delta 4a + \Delta 4b)/f4 < 2$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, f4 denotes the focal length of the fourth lens group, M denotes a zoom ratio of the zoom lens system.

7. The zoom lens system according to claim 3, wherein the following conditional expression is satisfied:

$$0.003 < \Delta 4b/(fT - fW) < 0.1$$

where $\Delta 4b$ denotes an absolute value of a moving amount of the fourth lens group along the optical axis from the focal length state where the fourth lens group locates the most image side position to the telephoto end state upon focusing on infinity, fT denote the focal length of the zoom lens system in the telephoto end state, and fW denotes the focal length of the zoom lens system in the wide-angle end state.

8. The zoom lens system according to claim 1, wherein the following conditional expression is satisfied:

$$0.003 < (\Delta 4a + \Delta 4b)/TLt < 0.1$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

9. The zoom lens system according to claim 8, wherein the following conditional expression is satisfied:

$$0.003 < \Delta 4a/(fT - fW) < 0.1$$

where $\Delta 4a$ denotes an absolute value of a moving amount of the fourth lens group along the optical axis from the wide-angle end state to a focal length state where the fourth lens group locates the most image side position upon focusing on infinity, fT denote the focal length of the zoom lens system in the telephoto end state, and fW denotes the focal length of the zoom lens system in the wide-angle end state.

10. The zoom lens system according to claim 8, wherein the following conditional expression is satisfied:

$$0.003 < \Delta 4b/(fT-fW) < 0.1$$

where $\Delta 4b$ denotes an absolute value of a moving amount of the fourth lens group along the optical axis from the focal length state where the fourth lens group locates the most image side position to the telephoto end state upon focusing on infinity, fT denote the focal length of the zoom lens system in the telephoto end state, and fW denotes the focal length of the zoom lens system in the wide-angle end state.

11. The zoom lens system according to claim 1, wherein the following conditional expression is satisfied:

$$0.003 < \Delta 4a/(fT-fW) < 0.1$$

where $\Delta 4a$ denotes an absolute value of a moving amount of the fourth lens group along the optical axis from the wide-angle end state to a focal length state where the fourth lens group locates the most image side position upon focusing on infinity, fT denote the focal length of the zoom lens system in the telephoto end state, and fW denotes the focal length of the zoom lens system in the wide-angle end state.

12. The zoom lens system according to claim 1, wherein the following conditional expression is satisfied:

$$0.003 < \Delta 4b/(fT-fW) < 0.1$$

where $\Delta 4b$ denotes an absolute value of a moving amount of the fourth lens group along the optical axis from the focal length state where the fourth lens group locates the most image side position to the telephoto end state upon focusing on infinity, fT denote the focal length of the zoom lens system in the telephoto end state, and fW denotes the focal length of the zoom lens system in the wide-angle end state.

13. The zoom lens system according to claim 1, wherein the following conditional expression is satisfied:

$$0.005 < M \cdot (\Delta 4a + \Delta 4b)/f4 < 2$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, f4 denotes the focal length of the fourth lens group, M denotes a zoom ratio of the zoom lens system.

14. The zoom lens system according to claim 1, wherein the following conditional expression is satisfied:

$$0.5 < fM/(fW \cdot fT)^{1/2} < 1.4$$

where fM denotes the focal length where the fourth lens group locates the most image side position, fW denotes the focal length of the zoom lens system in the wide-angle end state, and fT denotes the focal length of the zoom lens system in the telephoto end state.

15. The zoom lens system according to claim 1, wherein the following conditional expression is satisfied:

$$0.3 < \Delta 4b/\Delta 4a < 3.0$$

where $\Delta 4a$ denotes an absolute value of a moving amount of the fourth lens group along the optical axis from the wide-angle end state to a focal length state where the fourth lens group locates the most image side position upon focusing on infinity, and $\Delta 4b$ denotes an absolute value of a moving amount of the fourth lens group along the optical axis from the focal length state where the fourth lens group locates the most image side position to the telephoto end state upon focusing on infinity.

16. The zoom lens system according to claim 1, wherein the third lens group includes an aspherical lens.

17. The zoom lens system according to claim 16, further comprising an aperture stop that faces the aspherical lens in the third lens group.

18. The zoom lens system according to claim 1, wherein the aspherical lens is disposed in the third lens group, and the zoom lens system includes an aperture stop that faces the aspherical lens.

19. The zoom lens system according to claim 1, wherein the zoom lens system carries out focusing by moving the fourth lens group along the optical axis.

20. The zoom lens system according to claim 19, wherein the fourth lens group consists of one lens.

21. The zoom lens system according to claim 1, wherein the fourth lens group consists of one lens.

22. The zoom lens system according to claim 1, further comprising a low-pass filter located between the fourth lens group and the image.

23. A zoom lens system comprising, in order from an object:
   a first lens group having positive refractive power;
   a second lens group having negative refractive power;
   a third lens group having positive refractive power; and
   a fourth lens group having positive refractive power,
   wherein the zoom lens system includes at least one aspherical lens, and
   wherein when a state of lens group positions varies from a wide-angle end state to a telephoto end state, a distance between the first lens group and the second lens group varies, a distance between the second lens group and the third lens group varies, and a distance between the third lens group and the fourth lens group varies, and the fourth lens group moves along a zoom trajectory having a convex shape facing to an image.

24. The zoom lens system according to claim 23, wherein the following conditional expression is satisfied:

$$0.003 < (\Delta 4a + \Delta 4b)/TLt < 0.1$$

where $\Delta 4a$ denotes an absolute value of a moving amount of the fourth lens group along the optical axis from the wide-angle end state to a focal length state where the fourth lens group locates the most image side position upon focusing on infinity, $\Delta 4b$ denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

25. A zoom lens system comprising, in order from an object:
   a first lens group having positive refractive power;
   a second lens group having negative refractive power;
   a third lens group having positive refractive power; and
   a fourth lens group having positive refractive power,
   wherein when a state of lens group positions varies from a wide-angle end state to a telephoto end state, a distance between the first lens group and the second lens group increases, a distance between the second lens group and the third lens group decreases, and a distance between the third lens group and the fourth lens group varies, and the fourth lens group moves along a zoom trajectory having a convex shape facing an image; and the following conditional expression is satisfied:

$$0.003 < (\Delta 4a + \Delta 4b)/TLt < 0.1$$

where Δ4a denotes an absolute value of a moving amount of the fourth lens group along the optical axis from the wide-angle end state to a focal length state where the fourth lens group locates the most image side position upon focusing on infinity, Δ4b denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

26. The zoom lens system according to claim 25, wherein the following conditional expression is satisfied:

$$0.003 < \Delta 4a/(fT-fW) < 0.1$$

where Δ4a denotes an absolute value of a moving amount of the fourth lens group along the optical axis from the wide-angle end state to a focal length state where the fourth lens group locates the most image side position upon focusing on infinity, fT denotes the focal length of the zoom lens system in the telephoto end state, and fW denotes the focal length of the zoom lens system in the wide-angle end state.

27. A zoom lens system comprising, in order from an object:
a first lens group having positive refractive power;
a second lens group having negative refractive power;
a third lens group having positive refractive power;
a fourth lens group having positive refractive power, and
a low-pass filter located between the fourth lens group and an image,
wherein when a state of lens group positions varies from a wide-angle end state to a telephoto end state, a distance between the first lens group and the second lens group varies, a distance between the second lens group and the third lens group varies, and a distance between the third lens group and the fourth lens group varies, and the fourth lens group moves along a zoom trajectory having a convex shape facing the low-pass filter.

28. The zoom lens system according to claim 27, wherein the zoom lens system includes at least one aspherical lens, and an aperture stop that faces the aspherical lens, and the aspherical lens is disposed in the third lens group.

29. The zoom lens system according to claim 27, wherein the following conditional expression is satisfied:

$$0.003 < (\Delta 4a + \Delta 4b)/TLt < 0.1$$

where Δ4a denotes an absolute value of a moving amount of the fourth lens group along the optical axis from the wide-angle end state to a focal length state where the fourth lens group locates the most image side position upon focusing on infinity, Δ4b denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

30. A zoom lens system consisting of, in order from an object:
a first lens group having positive refractive power;
a second lens group having negative refractive power;
a third lens group having positive refractive power; and
a fourth lens group having positive refractive power,
wherein when a state of lens group positions varies from a wide-angle end state to a telephoto end state, a distance between the first lens group and the second lens group increases, a distance between the second lens group and the third lens group decreases, and a distance between the third lens group and the fourth lens group varies, and the fourth lens group moves along a zoom trajectory having a convex shape facing an image.

31. The zoom lens system according to claim 30 wherein the following conditional expression is satisfied:

$$0.003 < (\Delta 4a + \Delta 4b)/TLt < 0.1$$

where Δ4a denotes an absolute value of a moving amount of the fourth lens group along the optical axis from the wide-angle end state to a focal length state where the fourth lens group locates the most image side position upon focusing on infinity, Δ4b denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

32. A method for changing a focal length of a zoom lens system that includes, in order from an object, a first lens group having positive refractive power, a second lens group having negative refractive power, a third lens group having positive refractive power, and a fourth lens group having positive refractive power, wherein the zoom lens system includes at least one aspherical lens, and wherein variation of lens group positions from a wide-angle end state to a telephoto end state comprises steps of:
varying a distance between the first lens group and the second lens group;
varying a distance between the second lens group and the third lens group;
varying a distance between the third lens group and the fourth lens group; and
moving the fourth lens group along a zoom trajectory having a convex shape facing an image.

33. A method for changing a focal length of a zoom lens system that includes, in order from an object, a first lens group having positive refractive power, a second lens group having negative refractive power, a third lens group having positive refractive power, and a fourth lens group having positive refractive power, and wherein variation of lens group positions from a wide-angle end state to a telephoto end state comprises steps of:
increasing a distance between the first lens group and the second lens group;
decreasing a distance between the second lens group and the third lens group;
varying a distance between the third lens group and the fourth lens group; and
moving the fourth lens group along a zoom trajectory having a convex shape facing an image; and
wherein the following conditional expression is satisfied:

$$0.003 < (\Delta 4a + \Delta 4b)/TLt < 0.1$$

where Δ4a denotes an absolute value of a moving amount of the fourth lens group along the optical axis from the wide-angle end state to a focal length state where the fourth lens group locates the most image side position upon focusing on infinity, Δ4b denotes an absolute value of a moving amount of the fourth lens group along the optical axis from the focal length state where the fourth lens group locates the most image side position to the telephoto end state upon focusing on infinity, and TLt denotes a total lens length of the zoom lens system in the telephoto end state.

34. A method for changing a focal length of a zoom lens system that includes, in order from an object, a first lens group having positive refractive power, a second lens group having negative refractive power, a third lens group having positive refractive power, a fourth lens group having positive refractive power, and a low-pass filter located between the fourth lens group and an image and wherein variation of lens group positions from a wide-angle end state to a telephoto end state comprises steps of:

varying a distance between the first lens group and the second lens group;

varying a distance between the second lens group and the third lens group;

varying a distance between the third lens group and the fourth lens group; and moving the fourth lens group along a zoom trajectory having a convex shape facing the low-pass filter.

35. The method according to claim 34, wherein the method includes steps of:

decreasing a distance between the fourth lens group and the low-pass filter by moving the fourth lens group; and increasing a distance between the fourth lens group and the low-pass filter by moving the fourth lens group.

* * * * *